July 24, 1951  J. HALLER  2,561,735
MACHINE FOR MOLDING HELICAL GEARS
Filed July 21, 1949  2 Sheets-Sheet 1
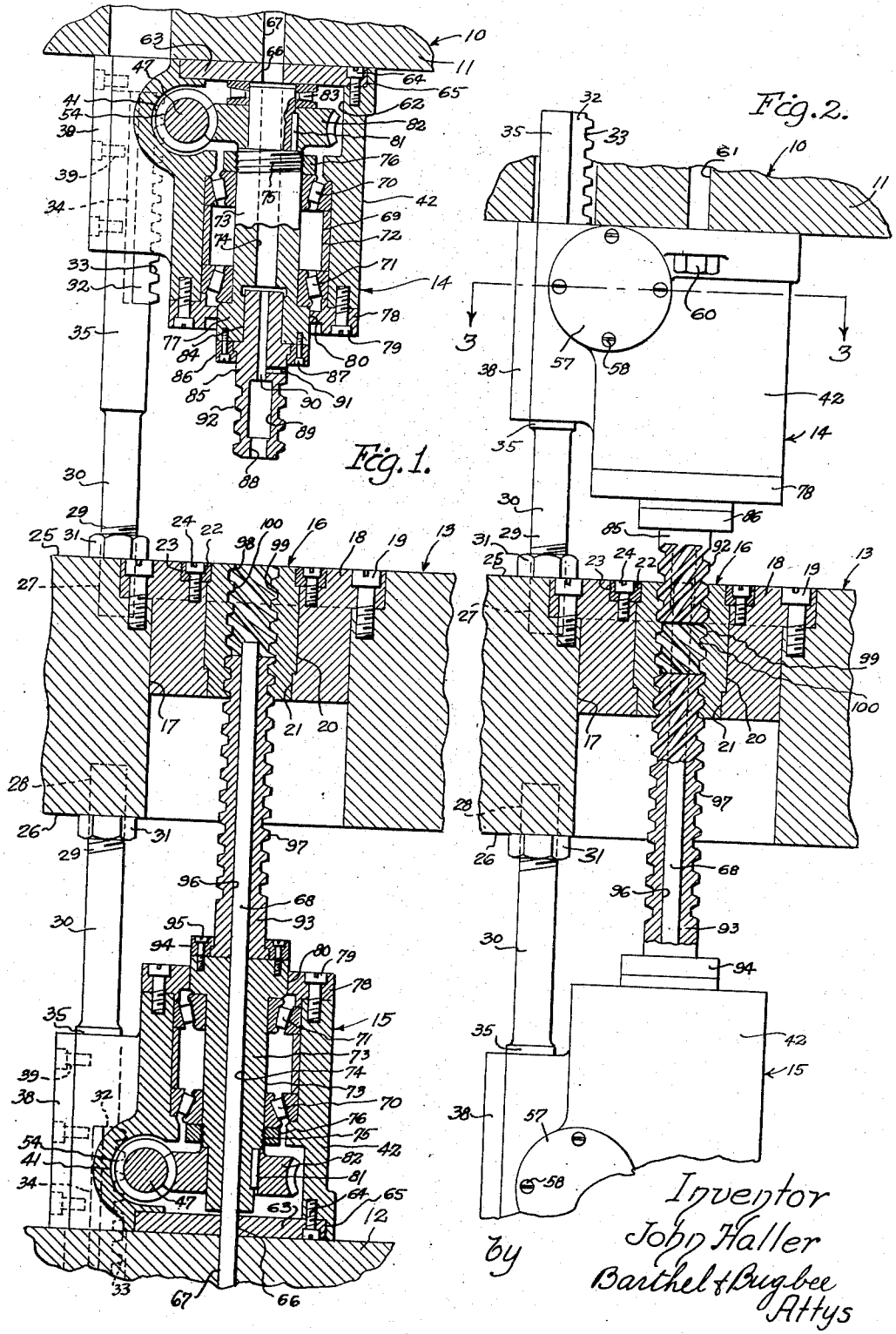
Inventor
John Haller
by Barthel & Bugbee
Attys July 24, 1951  J. HALLER  2,561,735
MACHINE FOR MOLDING HELICAL GEARS
Filed July 21, 1949
2 Sheets-Sheet 2

Inventor
John Haller
by Barthel & Bugbee
Attys

Patented July 24, 1951

2,561,735

UNITED STATES PATENT OFFICE 2,561,735

MACHINE FOR MOLDING HELICAL GEARS

John Haller, Northville, Mich.

Application July 21, 1949, Serial No. 106,044

11 Claims. (Cl. 78—.5)

This invention relates to machines and processes for making articles of powdered material and, in particular, to machines and processes for making gears.

One object of this invention is to provide a machine and process for making helical gears from powdered material, such as powdered metal, wherein the molding procedure is carried out without the need for splitting the mold or die and without the formation of the usual parting line or seam caused by the use of such split molds. Another object is to provide a machine and process for making helical gears from powdered material, wherein a solid mold is provided having a helically grooved cavity and wherein the molding plunger is correspondingly helically grooved and is rotated in timed relationship with the axial motion of the molding plunger as it is advanced into and retracted out of the mold cavity.

Another object is to provide a machine and process for making helical gears from powdered material, of the foregoing character, wherein similar mechanisms and a similar procedure are provided for advancing and retracting spirally ridged plungers into the opposite ends of an open-ended helically-grooved mold cavity, so that both plungers will properly enter the mold cavity and also that one of the plungers will pass entirely through the mold cavity at the termination of molding operations in order to eject the molded helical gear.

In the drawings:

Figure 1 is a fragmentary central vertical section, partly in side elevation, of a molding machine for molding helical gears, according to one form of the invention, retracted from its molding position;

Figure 2 is a fragmentary side elevation, partly in central vertical section, of the molding machine shown in Figure 1, advanced to its molding position;

Figure 4:
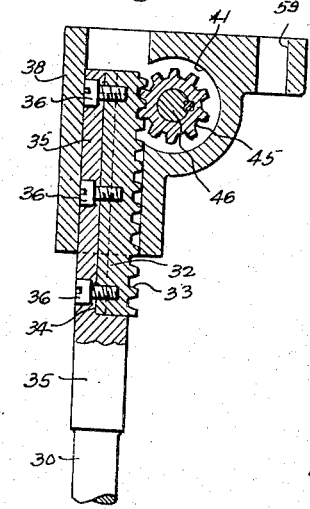
Figure 4 is a vertical section taken along the line 4—4 in Figure 3.

In general, the machine and process of the present invention provide means and a method for molding helical gears without the need for split molds and wherein the gear is molded and ejected by the operation of oppositely acting plungers. In particular, the invention provides an open-ended helically-grooved mold cavity and coacting helically ridged plungers connected to mechanism which not only advances them toward and away from the mold cavity, but also rotates them in timed relationship with their advancement so that they enter and leave the mold cavity in proper phase. The molding material is preferably powdered metal, either powdered iron or non-ferrous metal alloys, such as are known in the powdered metallurgy art.

Referring to the drawings generally, Figure 1 shows in central vertical section the central portion of a molding press, generally designated 10, of suitable design for use with a double-ended mold. Such a press is shown, for example, in the co-pending application of John Haller, Serial No. 780,851 filed October 20, 1947 for Briquetting Machine. Figure 1 shows the upper and lower platens 11 and 12 of such a press, together with the die table or bed 13 thereof. Secured to and mounted upon the upper and lower platens 11 and 12 are molding plunger rotating devices, generally designated 14 and 15 respectively, these in turn being connected to the table or bed 13 as described below. Mounted on the table or bed 13 is a mold or die, generally designated 16.

Referring to the drawings in detail, the press table or bed 13 is provided with a countersunk bore 17 in which a correspondingly flanged die or mold block 18 is secured as by the screws 19. The mold block in turn contains a stepped and countersunk bore 20 configured to receive the correspondingly stepped exterior surface 21 of the mold 16, the latter being held in position by a retaining ring 22 secured in the countersunk portion 23 of the bore 20, as by the screws 24.

The upper and lower surfaces 25 and 26 respectively of the press bed 13 are bored and threaded as at 27 and 28 respectively to receive the threaded inner ends 29 of fixed or stationary rack bars 30 forming the stationary portions of the molding plunger rotating devices 14 and 15. Since these are of similar construction, corresponding parts are designated with the same reference numerals and a single description will suffice for both. The rack bars 30 are locked in position by lock nuts 31 threaded upon the threaded portions 29 and at their outer ends are provided with rack inserts 32 in the form of elongated bars having rack teeth 33 on one face thereof, the opposite face being secured in a recess 34 (Figure 4) in the enlarged portion 35 of the rack bar 30 by screws 36 threaded therein. The enlarged portion 35 of each rack bar 30 is of approximately rectangular cross-section (Figure 3) and is slidably received in a vertical slot or bore 37 of corresponding rectangular cross-section, the outer wall of the bore 37 being formed by a retaining plate 38 bolted thereto as at 39 (Figure 1).

Figure 3:
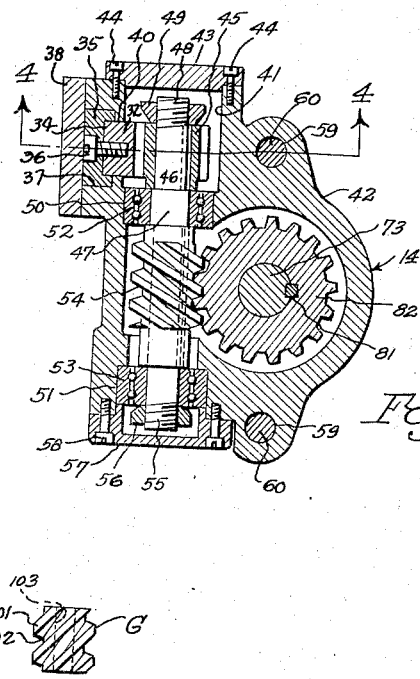
Figure 3 is a horizontal section through the plunger rotating mechanism, taken along the line 3—3 in Figure 2.

The rack insert 32 projects inward through an opening 40 from the bore 37 into a horizontal bore-like cavity 41 (Figure 3) in the upper portion of the housing 42 of the plunger rotating device 14 or 15. The cavity 41 is closed by an access plate 43 secured thereto as at 44. Mounted within the cavity 41 and meshing with the teeth 33 of the rack insert 32 is a pinion 45. The pinion 45 is mounted upon the reduced diameter end 46 of a shaft 47 the end of which is threaded as at 48 to receive a retaining nut 49 (Figure 3).

The horizontal bore-like cavity 41 has annular recesses 50 and 51 for receiving the outer races of anti-friction bearings 52 and 53 in which the opposite ends of the shaft 47 are journaled. Mounted on or integral with the shaft 47 is a worm 54. The opposite end of the shaft 47 from the end 48 is threaded as at 55 to receive a retaining nut 56, and the outer end of the cavity 41 is closed by an access plate 57 similar to the access plate 43 and similarly bolted as at 58 to the housing 42. The casing 42 itself is bored as at 59 (Figures 3 and 4) to receive bolts 60 which pass through correspondingly aligned vertical bores 61 in the upper and lower platens 11 and 12 and by means of which the plunger rotating devices 14 and 15 are secured to their respective platens 11 and 12. The casing 42 is provided with a vertical bore-like cavity 62 (Figures 1 and 3) opening into the horizontal cavity 41 and closed by a closure plate 63 (Figure 1) bolted as at 64 to the upper end of the casing 42, the cavity 62 being countersunk as at 65 for that purpose. The closure plate 63 and platens 11 and 12 are provided with bores 66 and 67 coaxial with the cavity 62 for receiving a core rod or inner plunger 68 (Figure 1), this being used in the present set-up of the machine 10 only with the lower plunger rotating device 15.

The bore-like cavity 62 is provided with an annular enlarged portion 69 (Figure 1) in which are mounted oppositely facing tapered roller bearings 70 and 71 separated by the spacing sleeve 72. Journaled in the tapered roller bearings 70 and 71 is a tubular shaft 73 having a bore 74 therethrough for the passage of the core rod or inner plunger 68. The tubular shaft 73 is threaded as at 75 to receive a retaining nut 76, the lower end of the tubular shaft 73 being provided with an enlargement 77 which engages the inner race of the anti-friction bearing 71, the retaining nut 76 engaging the corresponding inner race of the anti-friction bearing 70 to hold these parts in assembly. The end of the vertical bore-like cavity 62 adjacent the enlargement 77 is closed by an access plate 78 secured thereto as by the screws 79 (Figure 1). The access plate 78 is bored as at 80 for the passage of the enlargement 77 of the shaft 73. Keyed or otherwise drivingly secured as at 81 to the end of the shaft 73 adjacent the threaded portion 75 is a worm gear or worm wheel 82 which meshes with and is driven by the worm 54, thereby rotating the tubular shaft or plunger 73.

A tapered roller thrust bearing 83 is interposed between the worm gear 82 and the access plate 63 at the upper end of the casing 42 of the upper plunger rotating device 14. The tubular shaft plunger rotating device 14 is provided with a counterbore or socket 84 for receiving the upper end of the upper molding plunger 85, the latter being held in position by a retaining ring 86 secured to the shaft enlargement 77 as by the screws 87. The lower end of the plunger 85 is provided with a bore 88 adapted to receive the core rod 68 (Figure 6) and opening into an enlarged bore 89 (Figure 1) which in turn opens into a bore 90 having a port 91 extending transversely therefrom to the atmosphere. The upper molding plunger 85 is provided with a helical ridge 92 of configuration corresponding to the tooth or teeth of the helical gear G (Figure 8) to be molded.

Figure 8:
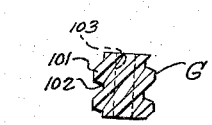
Figure 8 is a side elevation of the workpiece produced by the molding operations of Figures 5, 6 and 7, namely, a helical gear.

The lower tubular shaft 73, on the other hand, is not provided with the socket or counterbore 84 (Figure 1) but carries the lower tubular plunger 93 in end-abutting engagement. A retaining ring 94 secured as by the screws 95 to the shaft enlargement 84 on the lower shaft 73 holds the lower tubular plunger 93 in assembly with the lower shaft 73. The lower tubular plunger 93 is provided with an axial bore 96 for the passage of the core rod 68 and of approximately the same diameter plus a suitable clearance, so that the core rod 68 may slide axially relatively to the plunger 93. The plunger 93 is also provided with a helical rib or ribs 97 corresponding to the tooth or teeth of the gear G to be molded (Figure 8). Thus, the ridge or ridges 97 of the lower plunger 93 will correspond in configuration to the ridge or ridges 92 on the upper plunger 85.

The die or mold 16 is provided with a bore-like mold cavity 98 having helical grooves 99 corresponding in configuration to the helical ridges 92 and 97 on the upper and lower plungers 85 and 93 (Figure 1). The mold cavity 98 with its grooves 99 and helical ridges 100 between the grooves 99 is thus the counterpart of the teeth 101 and roots 102 of the gear G to be molded (Figure 8). The gear G may also be provided with an axial bore 103 for mounting it upon a shaft, in which case the core rod 68 is employed for that purpose. If the gear G is solid, the lower plunger 93 is likewise solid and the core rod 68 may be omitted. A gear with too great a tooth angle relatively to the axis is not self-starting in its ejection from the mold cavity after molding, hence the teeth or helical ridges of the gear should preferably make an angle of 30° or less with the axis of the gear, in order to be self-starting.

*Operation*

Prior to the commencement of the operation of the machine, let it be assumed that the helically ridged upper and lower plungers 85 and 93 have been properly secured in position upon their respective tubular shafts 73, and that they have been so adjusted relatively to the mold 16 that they will be in proper phase with the helical grooves 99 in the mold 16 to enter the grooves smoothly and easily when the upper and lower platens 11 and 12 are advanced a sufficient distance toward the press bed or table 13. When this is done, and the moving parts are properly aligned, the machine is ready for operation.

Figure 5:
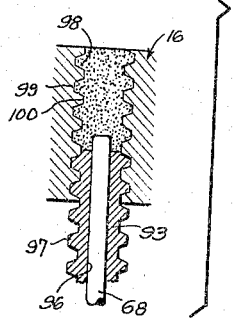
Figure 5 is a diagrammatic central vertical section through the central portion of Figure 1, with the parts in the same position as Figure 1, but with the mold cavity filled with powdered material.

To commence the operation, the operator advances the lower platen 12 upward until its helically ridged plunger 93 enters the helically grooved mold cavity 98. At the same time, he also advances the core rod 68 upward so that it moves along with the plunger 93 with its upper end projecting slightly above the upper end of the plunger 93. The moving parts now occupy the positions shown in Figures 1 and 5. The operator now operates the mold charging apparatus, such as that shown in my co-pending application Serial No. 780,851 previously referred to, to charge, that is fill, the mold cavity 98 with powdered material, such as powdered metal. Optionally, of course, the mold cavity 98 may be charged manually. The powdered material may be of any suitable type, the composition of which forms no part of the present invention. For example, powdered iron may be employed in this manner. The parts of the machine now occupy the relative positions shown in Figure 5.

Figure 6:
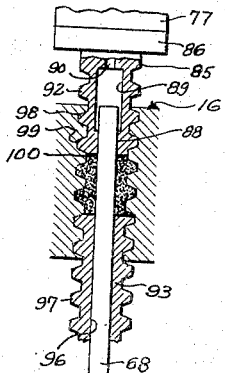
Figure 6 is a view similar to Figure 5, but with the molding plunger advanced to its position at the end of its molding stroke.

The operator now advances the upper platen 11 downward so that the helically ridged plunger 85 will enter the mold cavity 98 and compress the charge of powdered material. As the upper platen 11 moves downward, or the lower platen 12 moves upward, the pinion 45 rolls along the rack teeth 33 of the stationary rack shaft 30, 35, consequently rotating the shaft 47, worm 54, worm gear or wheel 82 (Figure 3), hollow shaft 73 and upper or lower helically ridged plunger 85 or 93 respectively. The downward motion of the upper platen 11 and the consequent rotation of the helically ridged upper plunger 85 causes this to thread its way into the mold cavity 98, as shown in Figure 2. As the plunger 85 enters the mold cavity 98 and engages the charge of powdered material, it compresses the material against the walls of the cavity and against the ends of the lower plunger 93 and core rod 68 serving as a cavity bottom. At the same time, the operator moves the core rod 68 upward as shown in Figure 6, until its upper end is approximately on the level of the press bed or table 16 (Figure 6) at the same time entering the bores 88 and 89 in the lower end of the plunger 85.

Figure 7:
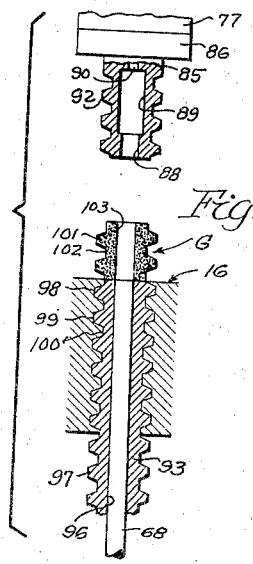
Figure 7 is a view similar to Figures 5 and 6, but with the molding plunger retracted and the ejection plunger advanced to eject the molded workpiece.

When compression of the mold charge has proceeded sufficiently far or to the required molding pressure (depending upon which is the controlling factor in the particular example), the upper platen 11 is retracted upward while the lower platen 12 is advanced upward to the positions shown in Figure 7. While this occurs, the upper plunger 85 threads its way out of the threaded mold cavity 98 while it is being rotated in the manner previously described, whereas the lower plunger 93 in the same manner threads its way upward into the threaded mold cavity 98 while the core rod 68 remains stationary. In this manner, the lower plunger 93 pushes the molded workpiece G upward out of the mold cavity 98, the workpiece G of course rotating simultaneously with the lower plunger 93. When the top of the lower plunger 93 rises to the level of the press bed or table 16, its motion is halted by the operator, since the workpiece G has now been completely ejected from the mold cavity 98.

The operator now removes the molded workpiece G from its ejected position shown in Figure 7, and then retracts the lower platen 12 and core rod 68 downward to their lower positions, as shown in Figures 1 and 8, opening the die cavity 98 for the reception of the next charge of powdered material. The operator then recharges the mold cavity 98 in the manner previously described, whereupon the molding operation is repeated as described above. The operation may be carried out repeatedly for the production of the desired number of workpieces, according to the foregoing precedure.

What I claim is:

1. A machine for molding helical gears from powdered material comprising a frame structure, a mold having a mold cavity with a helical groove therein mounted on said frame structure, a plunger carrier movable to and fro along said frame structure toward and away from said mold, a rotatable molding plunger mounted on said carrier in alignment with said mold cavity and having thereon a helical ridge of pitch and configuration corresponding to said helical groove, mechanism for advancing said plunger carrier toward said mold, and mechanism for rotating said plunger in synchronism with said plunger carrier advancing mechanism, said plunger rotating mechanism being arranged to effect entry of the end of said ridge into the end of said groove upon arrival of said plunger at said mold.

2. A machine for molding helical gears from powdered material comprising a frame structure, a mold having a mold cavity with a helical groove therein mounted on said frame structure, a plunger carrier movable to and fro along said frame structure toward and away from said mold, a rotatable molding plunger mounted on said carrier in alignment with said mold cavity and having thereon a helical ridge of pitch and configuration corresponding to said helical groove, mechanism for advancing said plunger carrier toward said mold, and mechanism including intermeshing gearing drivingly connected to said plunger for rotating said plunger in synchronism with said plunger carrier advancing mechanism, said plunger rotating mechanism being arranged to effect entry of the end of said ridge into the end of said groove upon arrival of said plunger at said mold.

3. A machine for molding helical gears from powdered material comprising a frame structure, a mold having a mold cavity with a helical groove therein mounted on said frame structure, a plunger carrier movable to and fro along said frame structure toward and away from said mold, a rotatable molding plunger mounted on said carrier in alignment with said mold cavity and having thereon a helical ridge of pitch and configuration corresponding to said helical groove, mechanism for advancing said plunger carrier toward said mold, and mechanism including a rack connected to said frame structure and gearing drivingly connecting said rack to said plunger for rotating said plunger in synchronism with said plunger carrier advancing mechanism, said plunger rotating mechanism being arranged to effect entry of the end of said ridge into the end of said groove upon arrival of said plunger at said mold.

4. A machine for molding helical gears from powdered material comprising a frame structure, a mold having a mold cavity with a helical groove therein mounted on said frame structure, a plunger carrier movable to and fro along said frame structure toward and away from said mold, a rotatable molding plunger mounted on said carrier in alignment with said mold cavity and having thereon a helical ridge of pitch and configuration corresponding to said helical groove mechanism for advancing said plunger carrier toward said mold, a rack connected to said frame structure, a pinion meshing with said rack, and worm gearing drivingly connecting said pinion to said plunger for rotating said plunger in synchronism with said plunger carrier advancing mechanism, said plunger rotating mechanism being arranged to effect entry of the end of said ridge into the end of said groove upon arrival of said plunger at said mold.

5. A machine for molding helical gears from powdered material comprising a frame structure, a mold having a mold cavity open at its opposite ends, said cavity having a helical groove therethrough, a pair of plunger carriers disposed on opposite sides of said mold and movable to and fro along said frame structure toward and away from said mold, a rotatable molding plunger mounted on each carrier in alignment with said mold cavity, each molding plunger having thereon a helical ridge of pitch and configuration corresponding to said helical groove, mechanism for advancing said plunger carriers toward said mold, and mechanism for rotating said plungers in synchronism with said plunger carrier advancing mechanism, said plunger rotating mechanism being arranged to effect entry of the ends of said ridges into the opposite ends of said groove upon arrival of said plungers at the opposite sides of said mold.

6. A machine for molding helical gears from powdered material comprising a frame structure, a mold having a mold cavity open at its opposite ends, said cavity having a helical groove therethrough, a pair of plunger carriers disposed on opposite sides of said mold and movable to and and fro along said frame structure toward and away from said mold, a rotatable molding plunger mounted on said carrier in alignment with said mold cavity, each molding plunger having thereon a helical ridge of pitch and configuration corresponding to said helical groove, mechanism for advancing said plunger carriers toward said mold, and mechanism including intermeshing gearing drivingly connected to said plungers for rotating said plungers in synchronism with said plunger carrier advancing mechanism, said plunger rotating mechanism being arranged to effect entry of the ends of said ridges into the opposite ends of said groove upon arrival of said plungers at the opposite sides of said mold.

7. A machine for molding helical gears from powdered material comprising a frame structure, a mold having a mold cavity open at its opposite ends, said cavity having a helical groove therethrough, a pair of plunger carriers disposed on opposite sides of said mold and movable to and fro along said frame structure toward and away from said mold, a rotatable molding plunger mounted on said carrier in alignment with said mold cavity, each molding plunger having thereon a helical ridge of pitch and configuration corresponding to said helical groove, mechanism for advancing said plunger carriers toward said mold, and mechanism including a pair of racks connected to said frame structure and gearing drivingly connecting each rack to one of said plungers for rotating said plungers in synchronism with said plunger carrier advancing mechanism, said plunger rotating mechanism being arranged to effect entry of the ends of said ridges into the opposite ends of said groove upon arrival of said plungers at the opposite sides of said mold.

8. A machine for molding helical gears from powdered material comprising a frame structure, a mold having a mold cavity open at its opposite ends, said cavity having a helical groove therethrough, a pair of plunger carriers disposed on opposite sides of said mold and movable to and fro along said frame structure toward and away from said mold, a rotatable molding plunger mounted on said carrier in alignment with said mold cavity, each molding plunger having thereon a helical ridge of pitch and configuration corresponding to said helical groove, mechanism for advancing said plunger carriers toward said mold, a pair of racks connected to said frame structure, a pinion meshing with each rack, and worm gearing drivingly connecting each pinion with its respective plunger for rotating said plunger in synchronism with said plunger carrier advancing mechanism, said plunger rotating mechanism being arranged to effect entry of the ends of said ridges into the opposite ends of said groove upon arrival of said plungers at the opposite sides of said mold.

9. A rotary molding plunger unit for a molding press having a reciprocable platen comprising a housing attachable to said platen for travel therewith, a molding plunger rotatably mounted in said housing, a rack stationarily attachable to a stationary part of the press, a pinion rotatably mounted in said housing and meshing with said rack, and gearing drivingly and rotatably connecting said plunger to said pinion.

10. A rotary molding plunger unit for a molding press having a reciprocable platen comprising a housing attachable to said platen for travel therewith, a molding plunger rotatably mounted in said housing, a rack stationarily attachable to a stationary part of the press, a pinion rotatably mounted in said housing and meshing with said rack, and gearing drivingly and rotatably connecting said plunger to said pinion, said plunger having a helical ridge thereon.

11. A rotary molding plunger unit for a molding press having a reciprocable platen comprising a housing attachable to said platen for travel therewith, a molding plunger rotatably mounted in said housing, a rack stationarily attachable to a stationary part of the press, a pinion rotatably mounted in said housing and meshing with said rack, and gearing including an intermeshing worm and worm wheel drivingly and rotatably connecting said plunger to said pinion.

JOHN HALLER.

REFERENCES CITED

The following references are of record in the file of this patent:

UNITED STATES PATENTS

| Number | Name | Date |
|---|---|---|
| 1,443,349 | Cooke | Jan. 30, 1923 |
| 2,253,003 | Whipple | Aug. 19, 1941 |
| 2,404,631 | Gronemeyer | July 26, 1946 |
| 2,447,434 | Schwarzkopf | Aug. 17, 1948 |